United States Patent
Koyama et al.

(10) Patent No.: US 9,421,827 B2
(45) Date of Patent: Aug. 23, 2016

(54) PNEUMATIC TIRE

(71) Applicant: SUMITOMO RUBBER INDUSTRIES, LTD., Kobe-shi, Hyogo (JP)

(72) Inventors: Toshio Koyama, Kobe (JP); Keiji Higuchi, Kobe (JP); Hirokazu Takano, Kobe (JP)

(73) Assignee: SUMITOMO RUBBER INDUSTRIES LTD., Kobe-Shi (JP)

( * ) Notice: Subject to any disclaimer, the term of this patent is extended or adjusted under 35 U.S.C. 154(b) by 486 days.

(21) Appl. No.: 13/861,444

(22) Filed: Apr. 12, 2013

(65) Prior Publication Data
US 2013/0269846 A1  Oct. 17, 2013

(30) Foreign Application Priority Data

Apr. 17, 2012  (JP) .................................. 2012-094082

(51) Int. Cl.
*B60C 11/03*  (2006.01)

(52) U.S. Cl.
CPC ............. *B60C 11/03* (2013.01); *B60C 11/0306* (2013.04); *B60C 11/0332* (2013.04);
(Continued)

(58) Field of Classification Search
CPC  B60C 11/03; B60C 11/0306; B60C 11/0332; B60C 11/0318; B60C 2011/0365; B60C 2011/0372; B60C 2011/0346; B60C 11/0302; B60C 11/0304
USPC ................ D12/527, 529, 559, 562, 594, 598; 152/900, 902
See application file for complete search history.

(56) References Cited

U.S. PATENT DOCUMENTS 5,178,698 A *  1/1993  Shibata ...................... 152/209.3
5,240,053 A *  8/1993  Baumhofer ......... B60C 11/0306
                                                     152/209.22

(Continued)

FOREIGN PATENT DOCUMENTS

EP         1619048 A1 *  1/2006  .............. B60C 11/03
JP    EP 0391300 A1 * 10/1990  .............. B60C 11/00

(Continued)

OTHER PUBLICATIONS

Machine Translation: JP06-143944; Matsushita, Tomekichi; (no date).*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A pneumatic tire comprises a tread portion provided with a circumferential shoulder main groove, shoulder lateral grooves extending from the shoulder main groove toward a tread edge, and middle lateral grooves extending from the shoulder main groove toward a tire equatorial plane, the shoulder main groove extending in a zigzag manner through an axially innermost and outermost points alternately, each middle lateral groove extending from each innermost point of the shoulder main groove with an angle of 50-75 degrees with respect to a tire axial direction, and each shoulder lateral groove extending from the shoulder main groove with the same inclination direction with the middle lateral groove at an angle of 10-25 degrees with respect to the tire axial direction, wherein the number of shoulder lateral grooves is larger than the number of middle lateral grooves.

9 Claims, 5 Drawing Sheets

(52) U.S. Cl.
CPC ..... *B60C11/0318* (2013.04); *B60C 2011/0346* (2013.04); *B60C 2011/0358* (2013.04); *B60C 2011/0365* (2013.04); *B60C 2011/0372* (2013.04); *B60C 2011/0374* (2013.04); *B60C 2011/0388* (2013.04)

(56) References Cited

U.S. PATENT DOCUMENTS

| | | | |
|---|---|---|---|
| 6,109,317 | A * | 8/2000 | Iwamura et al. .......... 152/209.18 |
| 6,283,184 | B1 * | 9/2001 | Tomita .................... B60C 11/00 152/209.18 |
| 2008/0000564 | A1 * | 1/2008 | Mukai ........................ 152/209.8 |
| 2010/0206446 | A1 * | 8/2010 | Oizumi ............... B60C 11/0306 152/209.18 |
| 2012/0073715 | A1 * | 3/2012 | Kawauchi ........... B60C 11/0302 152/209.18 |

FOREIGN PATENT DOCUMENTS

| | | | |
|---|---|---|---|
| JP | 06143944 A * | 5/1994 | .............. B60C 11/12 |
| JP | 2004-058839 A | 2/2004 | |

OTHER PUBLICATIONS

Machine Translation: EP 1619048 A1; Heine et al.; (no date).*

* cited by examiner

PNEUMATIC TIRE

BACKGROUND OF THE INVENTION

1. Field of the Invention

The present invention relates to a pneumatic tire capable of reducing tire noise without deteriorating other performance.

2. Description of the Related Art

In order to improve mud performance of tire while reducing tire noise, JP2004-58839A1 discloses a pneumatic tire as shown in FIG. 5. The tire includes a tread portion provided with: a shoulder main groove "a" disposed the nearest side of the tread edge Te; a plurality of shoulder lateral grooves b extending from the shoulder main groove toward the tread edge Te; and a plurality of middle lateral grooves c extending from the shoulder main groove "a" toward the tire equatorial plane Co.

The shoulder lateral grooves b include a first shoulder lateral groove bL having a large groove width and a second shoulder lateral groove bS having a small groove width compared to the first shoulder lateral groove bL. The first shoulder lateral groove bL and the second shoulder lateral groove bS are alternately arranged in a tire circumferential direction.

Additionally, the first and second shoulder lateral grooves bL, bS have the following relations:

WLi/WSi<WLo/WSo.

Here, WLi and WLo are groove widths of the first shoulder lateral groove bL at the axially inner and outer ends, respectively, and WSi and WSo are groove widths of the second shoulder lateral groove bS at the axially inner and outer ends, respectively.

Since the tire above has the first and second shoulder lateral grooves bL, bS arranged alternately with different groove widths, pitch noise is modulated into a wide frequency range so that the pattern noise turns to the so called white noise. Additionally, since the first shoulder lateral groove bL has a large groove width WLo at the tread edge Te, mud performance of the tire improves. Additionally, since the first shoulder lateral groove bL has the small groove width WLi at the inner end so as to decrease a groove volume thereof, tire noise reduces.

However, consumers request still further improved tire with low noise.

SUMMARY OF THE INVENTION

The present invention has been worked out in light of the circumstances described above, and has a main object of providing a pneumatic tire capable of reducing tire noise without deteriorating other performance such as wet performance and mud performance.

In accordance with the present invention, there is provided a pneumatic tire comprising a tread portion provided with a circumferentially and continuously extending shoulder main groove disposed the nearest side of a tread edge, a plurality of shoulder lateral grooves each extending from the shoulder main groove toward the tread edge, and a plurality of middle lateral grooves each extending from the shoulder main groove toward a tire equatorial plane, the shoulder main groove extending in a zigzag manner through axially innermost points and axially outermost points alternately, each middle lateral groove extending from each innermost point of the shoulder main groove with an angle θm of from 50 to 75 degrees with respect to an axial direction of the tire, and each shoulder lateral groove extending from the shoulder main groove, the shoulder lateral groove having the same inclination direction with the middle lateral groove at an angle θs of from 10 to 25 degrees with respect to the axial direction of the tire, wherein the number "ns" of shoulder lateral grooves is larger than the number "nm" of middle lateral grooves.

The tread edges are the axial outermost edges of the ground contacting patch of the tread portion which occurs under a normally inflated loaded condition.

The normally inflated loaded condition is such that the tire is mounted on a standard wheel rim and inflated to a standard pressure and loaded with a standard tire load.

The standard wheel rim means a wheel rim officially approved or recommended for the tire by standards organizations, the standard wheel rim is the "standard rim" specified in JATMA, the "Measuring Rim" in ETRTO, and the "Design Rim" in TRA or the like, for example.

The standard pressure means the "maximum air pressure" in JATMA, the "Inflation Pressure" in ETRTO, and the maximum pressure given in the "Tire Load Limits at various cold Inflation Pressures" table in TRA or the like. In case of passenger car tires, however, the standard pressure is uniformly defined by 180 kPa.

The standard load is the "maximum load capacity" in JATMA, the "Load Capacity" in ETRTO, and the maximum value given in the above-mentioned table in TRA or the like.

DETAILED DESCRIPTION

An embodiment of the present invention will be explained below with reference to the accompanying drawings.

Figure 1:
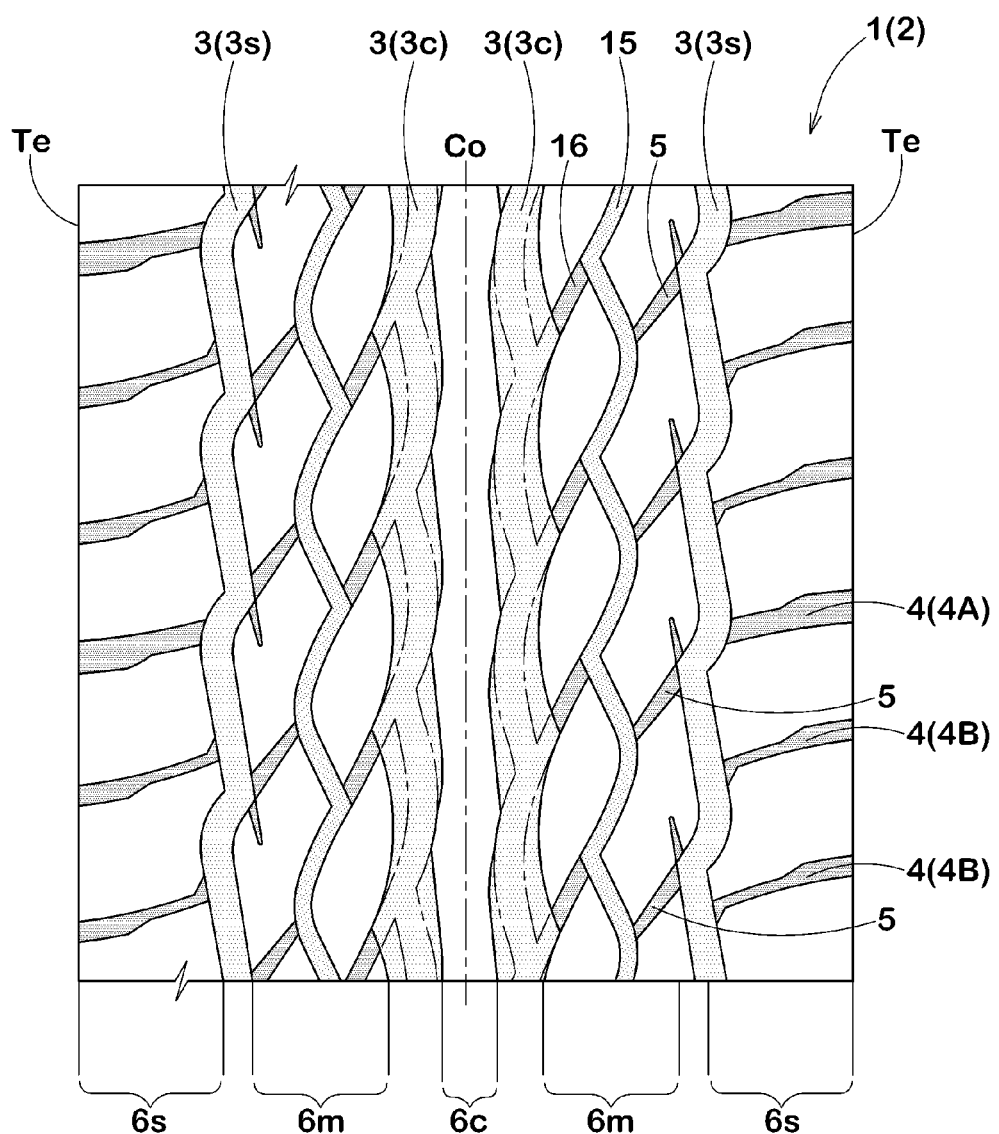
FIG. 1 is a development view of a tread portion showing an embodiment of the present invention.
Figure 2:
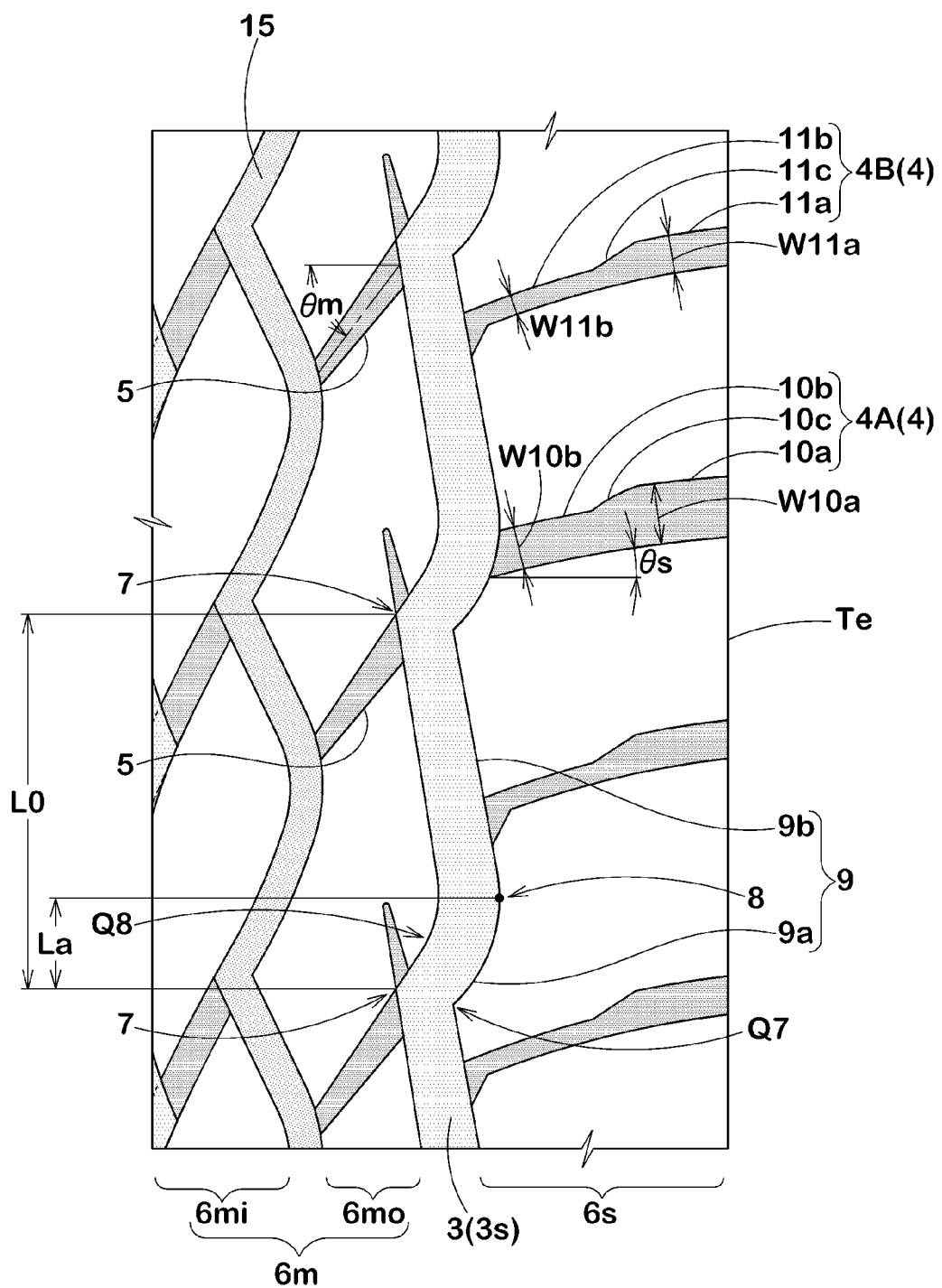
FIG. 2 is an enlarged development view of a shoulder main groove of FIG. 1.

Referring to FIG. 1, a pneumatic tire 1 in accordance with the present invention has a tread portion 2 provided with circumferentially and continuously extending main grooves 3 including a shoulder main groove 3s arranged at the nearest side of a tread edge Te, a plurality of shoulder lateral grooves 4 each extending from the shoulder main groove 3s toward the tread edge Te and a plurality of middle lateral grooves 5 each extending from the shoulder main groove 3s toward a tire equatorial plane Co.

In this embodiment, the main grooves 3 include a pair of shoulder main grooves 3s and a pair of crown main grooves 3c between the shoulder main grooves 3s. The crown main grooves 3c are arranged both sides of the tire equatorial plane Co. Thus, the main grooves 3 separate the tread portion 2 into five land portions which include: a pair of shoulder portions 6s, 6s each between the shoulder main groove 3s and the tread edge Te at each side of the tire equatorial plane Co; a pair of middle portions 6m each between the shoulder main groove 3s and the crown main groove 3c at each side of the tire equatorial plane Co; and a crown portion 6c between a pair of crown main grooves 3c.

The main grooves 3 may include a pair of shoulder main grooves 3s, 3s and one crown main groove 3c so that four land portions are separated on the tread portion 2 that include a pair of crown portions 6m, 6m each between the crown main groove 3c and the shoulder main groove 3s, and a pair of shoulder portions 6s, 6s.

In each side of the tire equatorial plane Co, the shoulder main groove 3c extends in a zigzag manner through axially innermost points 7 and axially outermost points 8 alternately so as to prevent a large pipe resonance noise generated therein. The shoulder main groove 3s comprises a plurality of zigzag elements 9 between adjacent innermost points 7, 7 as repeated pitches each of which includes a first inclined part 9a extending from the outermost point 8 to one of the innermost points 7 and a second inclined part 9b extending from the outermost point 8 to the other innermost point 7. Each of the first and second inclined parts 9a, 9b may have a straight shape or a shape having a curved portion at least partially therein. In this embodiment, the first inclined part 9a has a curved shape, and the second inclined part 9b has a straight shape.

The zigzag element 9 of the shoulder main groove 3c has a pitch length L0 between adjacent innermost points 7, 7 in a circumferential direction of the tire. In this embodiment, the outermost point 8 between the adjacent innermost points 7, 7 is offset to one of the innermost points 7. Preferably, a circumferential length La between the outermost point 8 and the innermost point 7 closest to the outermost point is in a range of 0.1 to 0.3 times with respect to the pitch length L0. Thus, since pitch noise which depends on the first and second inclined parts 9a, 9b of the shoulder main grooves 3c is modulated into a wide frequency range, tire noise may reduce. When the length La is more than 0.3 times with respect to the pitch length L0, the advantages above is liable to deteriorate. When the length La is less than 0.1 times with respect to the pitch length L0, drainage performance and wear resistance of the tire are liable to deteriorate due to sharpened zigzag corners Q7, Q8.

Each shoulder lateral groove 4 extends from the shoulder main groove 3s to the tread edge Te with an angle θs of from 10 to 25 degrees with respect to the axial direction of the tire so that each shoulder lateral groove 4 is inclined the same direction. In this embodiment, the shoulder portion 6s is divided into a plurality of blocks by shoulder lateral grooves 4.

Shoulder lateral grooves 4 include a first shoulder lateral groove 4A having a large groove width and a second shoulder lateral groove 4B having a small groove width compared to the first shoulder lateral groove 4A. In this embodiment, one first shoulder lateral groove 4A is arranged every two second shoulder lateral grooves 4B.

The first shoulder lateral groove 4A comprises an axially outer wide portion 10a having a groove width W10a, an axially inner narrow portion 10b having a groove width W10b and a tapered portion 10c therebetween having a groove width being gradually changing. Preferably, the groove width W10a of the wide portion 10a is not less than 1.2 times with respect to the groove width W10b of the narrow portion 10b.

Similarly, the second shoulder lateral groove 4B comprises an axially outer wide portion 11a having a groove width W11a, an axially inner narrow portion 11b having a groove width W11b and a tapered portion 11c therebetween having a groove width being gradually changing. Preferably, the groove width W11a of the wide portion 11a is not less than 1.2 times with respect to the groove width W11b of the narrow portion 11b. Still further preferably, the groove width W10b of the narrow portion 10b of the first shoulder lateral groove 4A is larger than the groove width W11a of the wide portion 11a of the second shoulder lateral groove 4B.

Thus, since the shoulder lateral grooves 4 include at lest two kinds of grooves 4A, 4B having different groove widths, pitch noise generated from shoulder lateral grooves 4 is modulated into a wide frequency range. Additionally, since the wide portions 10a and 11a having large groove widths are provided at the tread edge Te which has a large contribution to mud performance, an improved mud performance of the tire is obtained. Moreover, since the narrow portions 10b and 11b having small groove widths are provided toward the tire equatorial plane Co which has a large contribution to tire noise, noise performance of the tire is improved. Namely, the tire 1 in accordance with the present embodiment reduces tire noise without deteriorating mud performance.

Each middle lateral groove 5 extends from each innermost point 7 of the shoulder main groove 3s having an angle θm of from 50 to 75 degrees with respect to the axial direction of the tire. Each middle lateral groove 5 has the same inclination direction with shoulder lateral groove 4.

In each side of the tire equatorial plane Co, the middle portion 6m is provided with a circumferentially extending sub groove 15 in an axially center region thereof which divides the middle portion 6m into an axially inner middle region 6mi and an axially outer middle region 6mo. The sub groove 15 extends in a zigzag manner having the same pitches with the shoulder main grooves 3s, and has a groove width smaller than that of main grooves 3.

Each middle lateral groove 5 traverses the axially outer middle region 6mo so that the outer middle region 6mo is divided into a plurality of blocks.

Since each middle lateral groove 5 extends from each innermost point 7 of the shoulder main groove 3s, the number "nm" of middle lateral grooves 5 is the same with the number of zigzag elements 9 of the shoulder main grooves 3s in each side of the tire equatorial plane Co. On the other hand, the number "ns" of shoulder lateral grooves 4 is larger than the number "nm" of middle lateral grooves 5 in each side of the tire equatorial plane Co. Accordingly, since shoulder and middle lateral grooves 5 are arranged different positions in the circumferential direction of the tire, most of shoulder and the middle lateral grooves 4, 5 come into contact on the ground in different timing. Additionally, since shoulder and middle lateral grooves 4, 5 are provided in the different numbers in each side of the tire equatorial plane Co, pitch noise generated from lateral grooves 4, 5 is modulated into a wide frequency range so that tire noise is reduced.

Preferably, a ratio ns/nm of the number "ns" of shoulder lateral grooves 4 to the number "nm" of middle lateral grooves 5 is 3/2. when the ratio ns/nm is an integer, a peak noise with a frequency that is an integral multiple of the pitch noise frequency of the middle lateral grooves 5 may be generated. Additionally, when the ratio ns/nm is not less than 2.0, uneven wear of the tread portion 2 or low steering stability of the tire may be caused by offering an enhanced large pattern rigidity between the outer middle region 6mo and the inner middle region 6*mi*. Preferably, for the ratio ns/nm, 4/3, 5/3, 5/4 and 7/4 may be also used.

Figure 4:
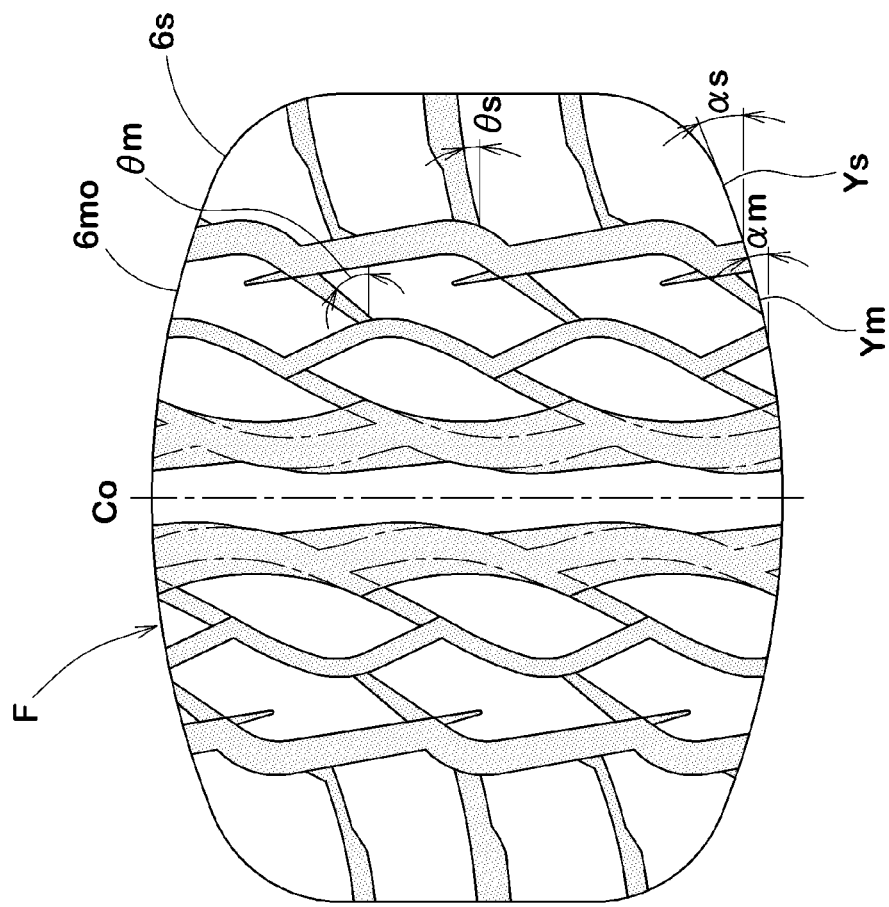
FIG. 4 is a plan view showing a footprint of the tread portion.
Figure 5:
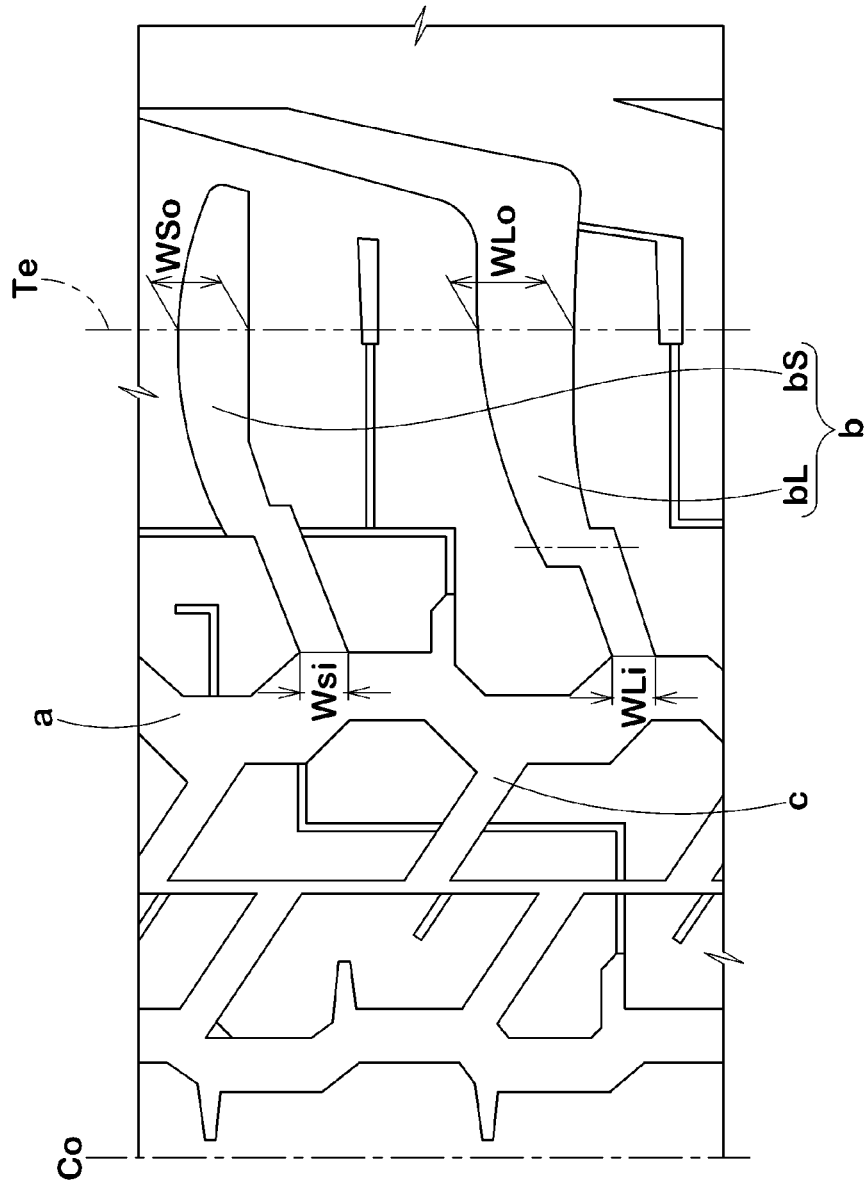
FIG. 5 is a development view of a tread portion showing a conventional tire.

In addition, the angle θm of the middle lateral groove 5 is set in a range of from 50 to 70 degrees, and the angle θs of the shoulder lateral groove 4 is set in a range of from 10 to 25 degrees. Thus, the pitch noise generated from the middle and shoulder lateral grooves 5, 4 is reduced, since each of middle and shoulder lateral grooves 5, 4 gradually comes into contact with the road when the tire is traveling. FIG. 4 shows a plan view of a footprint F of the tread portion 2. Referring to FIG. 4, the footprint F in this embodiment has a circumferential contact end Ym of the outer middle region 6*mo* with an angle αm with respect to the tire axial direction which differs from the angle θm. Similarly, the footprint F in this embodiment has a circumferential contact end Ys of the shoulder portion 6s with an angle αs with respect to the tire axial direction which differs from the angle θs. Thus, each of middle and shoulder lateral grooves 5, 4 gradually comes into contact with the road.

Figure 3:
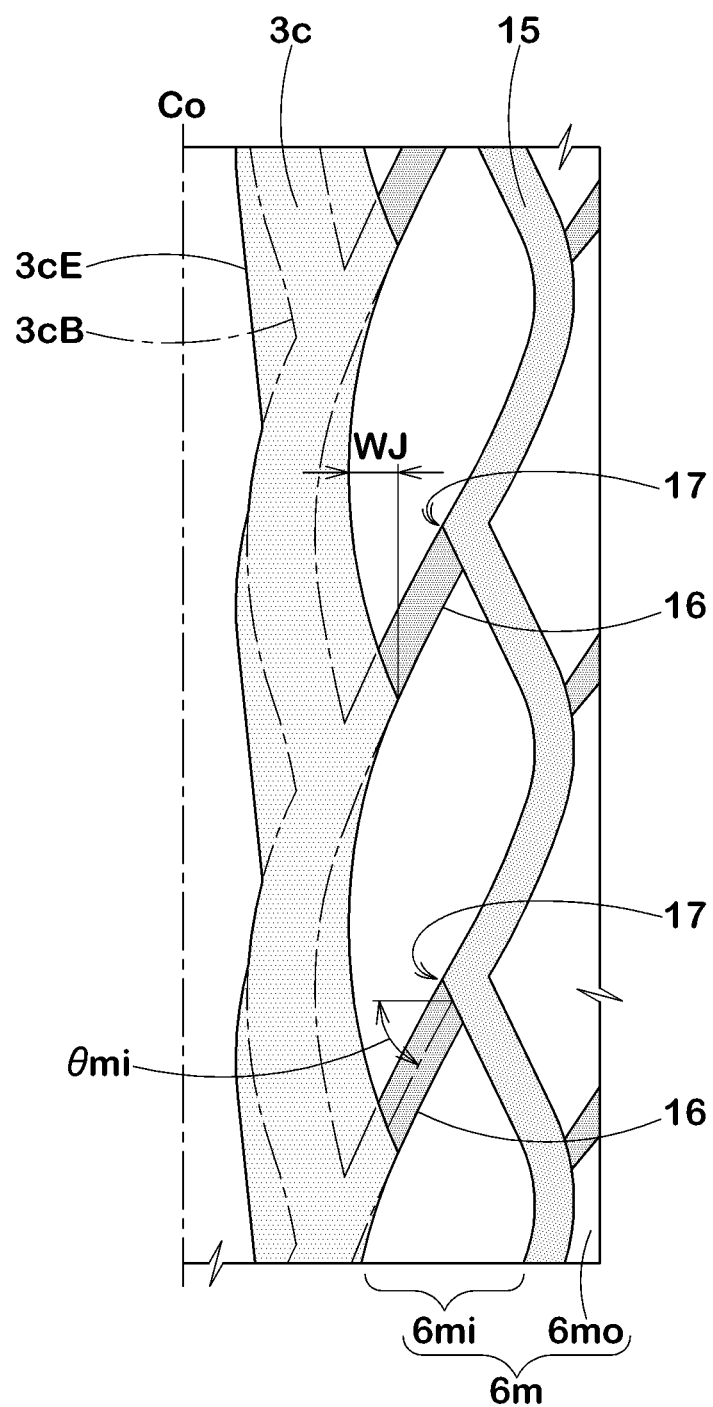
FIG. 3 is an enlarged development view of a crown main groove of FIG. 1.

Referring to FIG. 3, the inner middle region 6*mi* is provided with a plurality of inner middle lateral grooves 16 which divide the inner middle region 6*mi* into a plurality of blocks. Each inner middle lateral grooves 16 extend from each innermost point 17 toward the tire equatorial plane Co having an angle θmi of from 50 to 75 degrees with respect to the tire axial direction with the same inclination with the middle lateral groove 5. The inner middle lateral grooves 16 have substantially same configuration with the middle lateral grooves 5.

The crown main groove 3c extends in a zigzag manner having the same number of the zigzag elements of the shoulder main groove 3s. In order to improve drainage performance around the tire equatorial plane Co, the crown main groove 3c preferably has a groove width larger than that of the shoulder main grooves 3s. In order to further improve drainage performance, the crown main groove 3c preferably has zigzag amplitude W3 smaller than that of shoulder main grooves 3s. In order to reduce tire noise due to a large groove width with a small zigzag amplitude of the crown main groove, a zigzag shape defined by the groove edge 3cE (a ridgeline between the ground contact surface and a groove wall) and a zigzag shape defined by the groove bottom edge 3cB are different from each other for preventing pipe resonance in the groove. Namely, at least one factor such as zigzag amplitude, a pitch length and a zigzag phase is different from each other between the zigzag shapes 3cE and 3cB. In this embodiment, zigzag amplitude and phase are different between the zigzag shapes 3cE and 3cB.

The present invention is more specifically described and explained by means of the following Examples and References. It is to be understood that the present invention is not limited to these Examples.

Comparison Test

Pneumatic tires for SUV each having a tire size of 275/55R20 with a basic pattern of FIG. 1 and the same internal structure except for the detail shown in Table 1 were made and tested.

Each tire has substantially the same crown main groove 3c and sub grooves 15. Additionally, each tire has the same structure as regards the number of zigzag elements, zigzag amplitude, groove width and groove depth of shoulder main groove 3s except for the ratio La/L0. In addition, each tire has the same structure as regards the inclination direction, number of grooves, groove width and groove depth of the middle lateral groove 5 except for the angle θm. Although each tire has the different shoulder lateral groove 4 as regards the angle θs, number "ns" of grooves and configuration about the first and second shoulder lateral grooves 4A and 4B, each tire has the same total groove area of shoulder lateral grooves 4. Test methods are as follows.

Tire Noise Test:

Each test tire was installed on four wheels of a SUV having a 5,600 cc displacement using a rim of 20×9J with an internal pressure of 200 kPa. A test driver drove the SUV on a test course having a dry asphalt road, and evaluated internal vehicle noise by his feeling. The results are shown with an index of 100 representing a value in Ref. 1. The larger the value, the better the performance is.

Wet Performance Test:

A test driver drove the SUV on a road with 6 mm water deep and measured the speed at which hydroplaning phenomenon occurred. Each test result was shown with an index of 100 representing a value in Ref. 1. The larger the value, the better the performance is.

TABLE 1

|  | Ref. 1 | Ex. 1 | Ex. 2 | Ex. 3 | Ref. 2 | Ref. 3 | Ex. 4 | Ex. 5 | Ref. 4 | Ref. 5 | Ref. 6 |
|---|---|---|---|---|---|---|---|---|---|---|---|
| Ratio La/L0 | 0.2 | 0.2 | 0.2 | 0.2 | 0.2 | 0.2 | 0.2 | 0.2 | 0.2 | 0.2 | 0.2 |
| Middle lateral groove angle θm (deg.) | 45 | 50 | 65 | 75 | 80 | 65 | 65 | 65 | 65 | 65 | 65 |
| Shoulder lateral groove angle θs (deg.) | 15 | 15 | 15 | 15 | 15 | 5 | 10 | 25 | 30 | 15 | 15 |
| Inclination direction (*) | same | same | same | same | same | same | same | same | same | opposite | same |
| Ratio ns/nm | 3/2 | 3/2 | 3/2 | 3/2 | 3/2 | 3/2 | 3/2 | 3/2 | 3/2 | 3/2 | 2/2 |
| number of First shoulder lateral grooves:number of second shoulder lateral grooves | 1/2 | 1/2 | 1/2 | 1/2 | 1/2 | 1/2 | 1/2 | 1/2 | 1/2 | 1/2 | 1/2 |
| Tire noise test (Index) | 100 | 110 | 115 | 110 | 102 | 100 | 110 | 108 | 103 | 115 | 98 |
| Wet performance test (Index) | 100 | 105 | 107 | 108 | 103 | 103 | 107 | 107 | 103 | 98 | 108 |

|  | Ex. 6 | Ex. 7 | Ex. 8 | Ex. 9 | Ex. 10 | Ex. 11 | Ex. 12 | Ex. 13 |
|---|---|---|---|---|---|---|---|---|
| Ratio La/L0 | 0.05 | 0.1 | 0.3 | 0.4 | 0.2 | 0.2 | 0.2 | 0.2 |
| Middle lateral groove angle θm (deg.) | 65 | 65 | 65 | 65 | 65 | 65 | 65 | 65 |
| Shoulder lateral groove angle θs (deg.) | 15 | 15 | 15 | 15 | 15 | 15 | 15 | 15 |
| Inclination direction (*) | same | same | same | same | same | same | same | same |
| Ratio ns/nm | 3/2 | 3/2 | 3/2 | 3/2 | 4/2 | 3/2 | 3/2 | 3/2 |
| number of First shoulder lateral grooves:number of second shoulder lateral grooves | 1/2 | 1/2 | 1/2 | 1/2 | 1/2 | 1/0 | 1/1 | 1/3 |
| Tire noise test (Index) | 117 | 117 | 113 | 105 | 102 | 110 | 112 | 117 |
| Wet performance test (Index) | 104 | 105 | 108 | 108 | 111 | 108 | 106 | 104 |

(*) Inclination direction: Comparison with regard to inclination direction between shoulder lateral groove and middle lateral groove From the test results, it was confirmed that Example tires in accordance with the present invention can be effectively improved tire noise while maintaining wet performance.

The invention claimed is:

1. A pneumatic tire comprising:
  a tread portion provided with a circumferentially and continuously extending shoulder main groove disposed the nearest side of a tread edge, a plurality of shoulder lateral grooves each extending from the shoulder main groove toward the tread edge, and a plurality of middle lateral grooves each extending from the shoulder main groove toward a tire equatorial plane;
  the shoulder main groove extending in a zigzag manner through axially innermost points and axially outermost points alternately, the shoulder main groove comprising a plurality of zigzag elements between adjacent innermost points as repeated pitches
  each of which includes
  a first inclined part extending from the outermost point to one of the innermost points in a curved manner which is convex toward the tread edge and
  a second inclined part extending from the outermost point to the other innermost point in a straight manner;
    each middle lateral groove extending from each innermost point of the shoulder main groove with an angle θm of from 50 to 75 degrees with respect to an axial direction of the tire; and
    each shoulder lateral groove extending from the shoulder main groove, the shoulder lateral groove having the same inclination direction with the middle lateral groove at an angle θs of from 10 to 25 degrees with respect to the axial direction of the tire,
    wherein the number "ns" of shoulder lateral grooves is larger than the number "nm" of middle lateral grooves.

2. The tire according to claim 1, wherein a ratio ns/nm of the number "ns" of shoulder lateral grooves to the number "nm" of middle lateral grooves is 3/2.

3. The tire according to claim 1, wherein the shoulder lateral grooves include a first shoulder lateral groove and a second shoulder lateral groove having a groove width smaller than that of the first shoulder lateral groove, and one first shoulder lateral groove is arranged every two second shoulder lateral grooves.

4. The tire according to claim 1, wherein the shoulder main groove has a pitch length L0 between adjacent innermost points in a circumferential direction of the tire, and the outermost point between the adjacent innermost points is offset to one of the innermost points so that a circumferential length between the outermost point and the innermost point closest to the outermost point is in a range of 0.1 to 0.3 times the pitch length L0.

5. The tire according to claim 1, wherein the tire has a shoulder portion between the shoulder main groove and the tread edge, the tire has a footprint of the tread portion under a normally inflated loaded condition such that the tire is mounted on a standard wheel rim and inflated to a standard pressure and loaded with a standard tire load, and the footprint has a circumferential contact end Ys of the shoulder portion with an angle θs with respect to the tire axial direction which differs from the angle θs of the shoulder lateral groove.

6. The tire according to claim 1, wherein the first inclined part has a circumferential length smaller than that of the second inclined part.

7. The tire according to claim 6, wherein each middle lateral groove is connected to an end of a first inclined part of the shoulder main groove so that a groove edge of the middle lateral groove and a groove edge of the first inclined part are aligned linearly.

8. The tire according to claim 1, wherein each middle lateral groove is connected to an end of a first inclined part of the shoulder main groove so that a groove edge of the middle lateral groove and a groove edge of the first inclined part are aligned linearly.

9. The tire according to claim 1, wherein at least one of the shoulder lateral grooves is communicated with the first inclined part of the shoulder main groove.

* * * * *